United States Patent [19]

Smit

[11] Patent Number: 5,016,933
[45] Date of Patent: May 21, 1991

[54] AUTOMOTIVE BUMPER AND TAILGATE

[76] Inventor: Huug W. Smit, Rte. 3, Box 33B, Clanton, Ala. 35045

[21] Appl. No.: 327,730

[22] Filed: Mar. 23, 1989

[51] Int. Cl.$^5$ ............................................. B60R 19/48
[52] U.S. Cl. .................................... 293/117; 296/57.1
[58] Field of Search ................... 293/117, 132; 296/61, 296/57.1

[56] References Cited

U.S. PATENT DOCUMENTS

| | | | |
|---|---|---|---|
| 4,099,760 | 7/1978 | Mascott et al. | 293/117 |
| 4,125,214 | 11/1978 | Penn | 293/117 |
| 4,735,448 | 4/1988 | Hart | 293/117 |
| 4,834,273 | 5/1989 | Cimino | 293/117 |

*Primary Examiner*—Robert R. Song
*Attorney, Agent, or Firm*—Fleit, Jacobson, Cohn, Price, Holman & Stern

[57] ABSTRACT

A bumper for an automobile or a similar vehicle which includes a tailgate structure and a mounting arrangement which enables the tailgate structure to pivot about an axis generally transverse of the vehicle at the rear thereof and at the lower edge portion of the tailgate so that in the event of an impact occurring on the bumper, such as might occur when a trailing vehicle hits the bumper, the tailgate structure will pivot downwardly in a yieldable manner to cushion the shock of the impact, reduce the damage to the vehicles and enhance the safety aspects of bumper structures. The tailgate structure includes tailgate support arms of generally J-shaped configuration associated with a housing and bracket structure as well as as a spring device and control arrangements by which the tailgate is capable of yieldable movement for cushioning the impact shock.

6 Claims, 7 Drawing Sheets

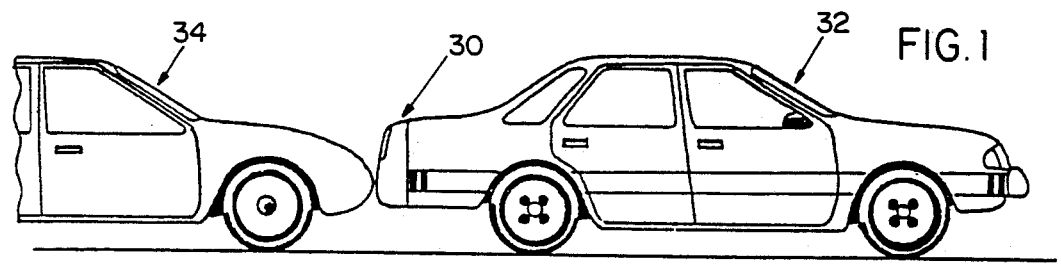
FIG. 1
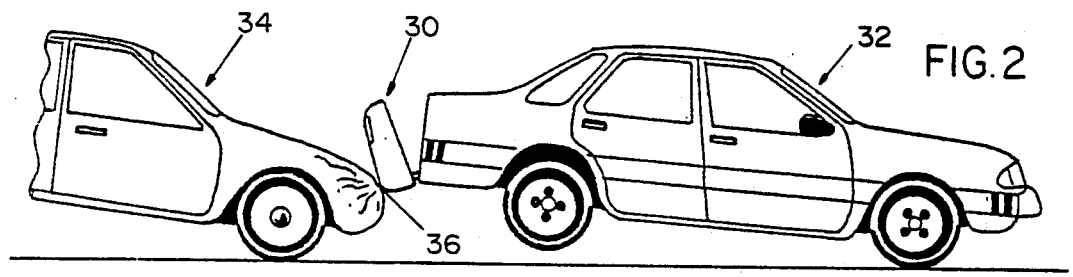
FIG. 2
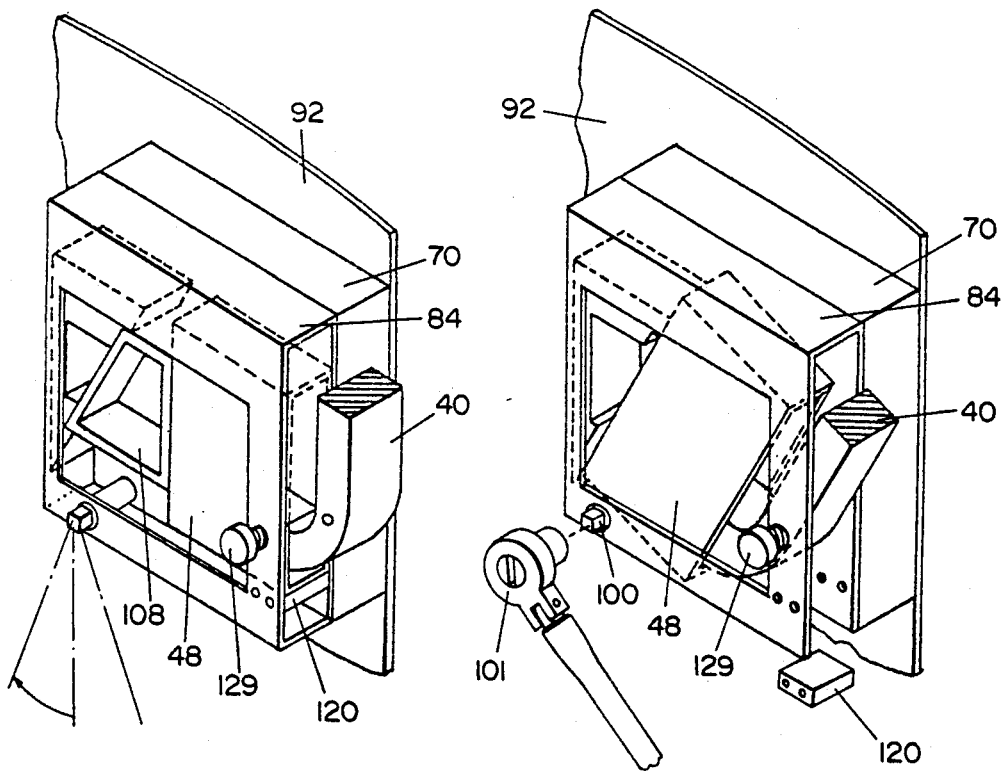
FIG. 3
FIG. 4

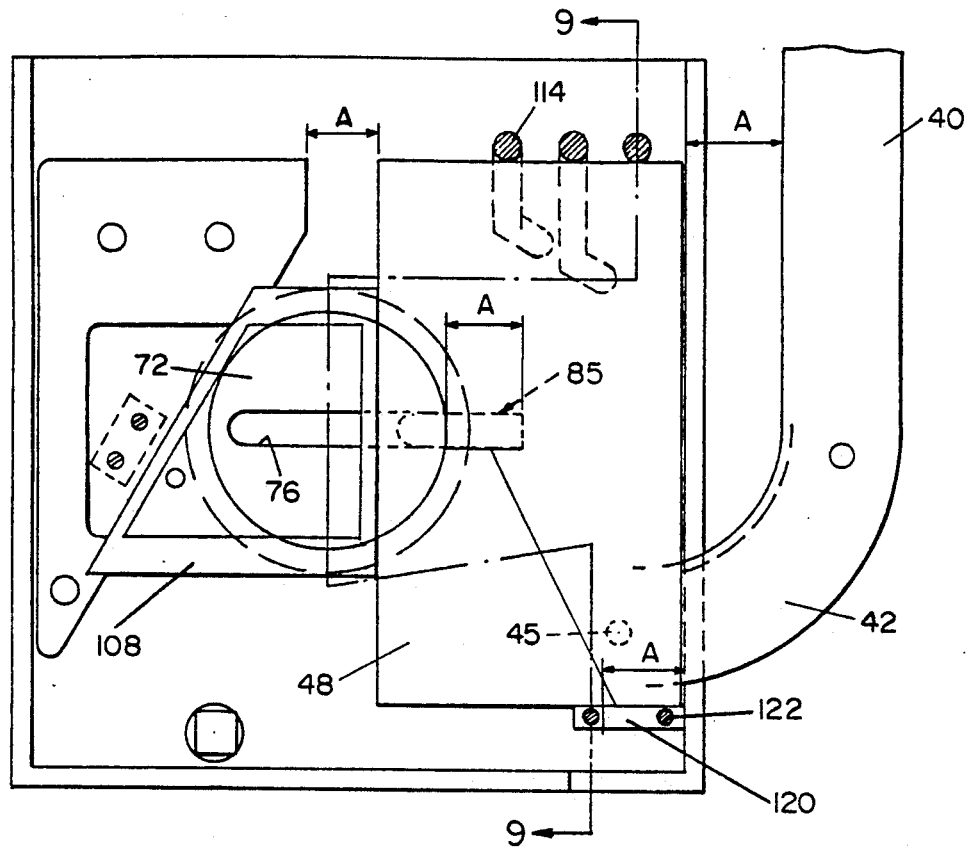
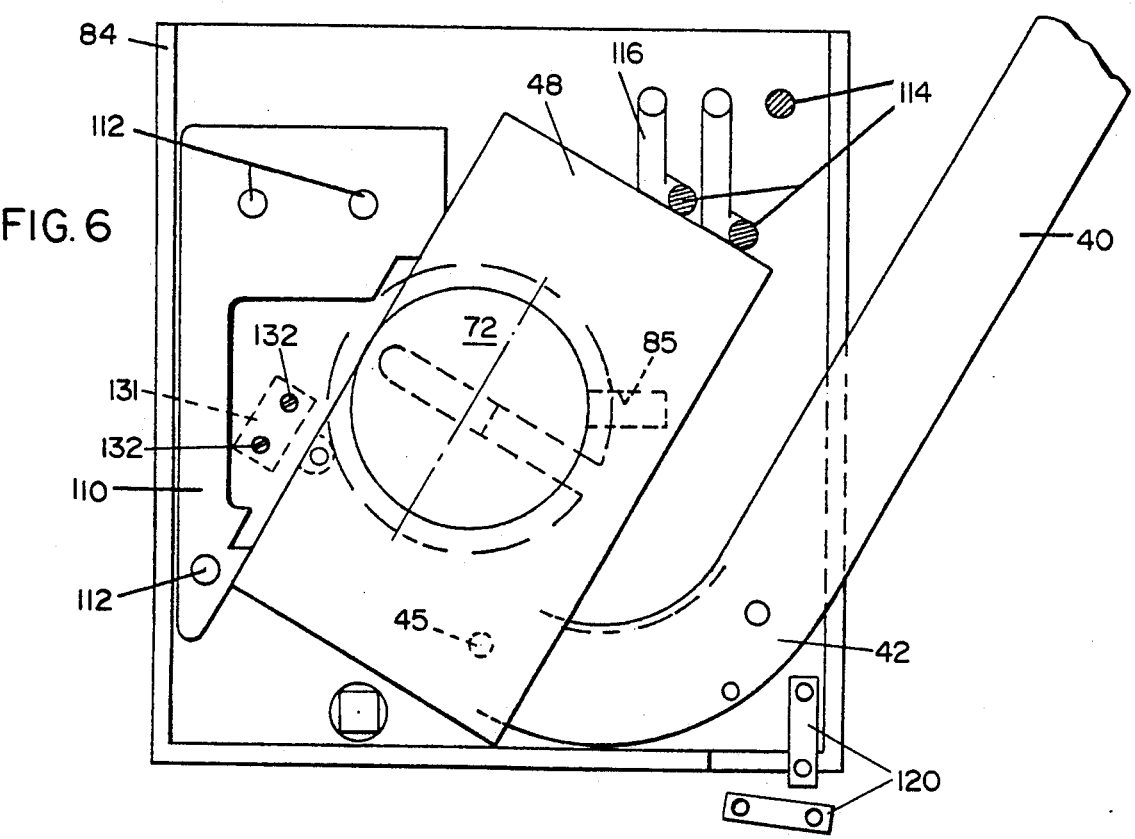

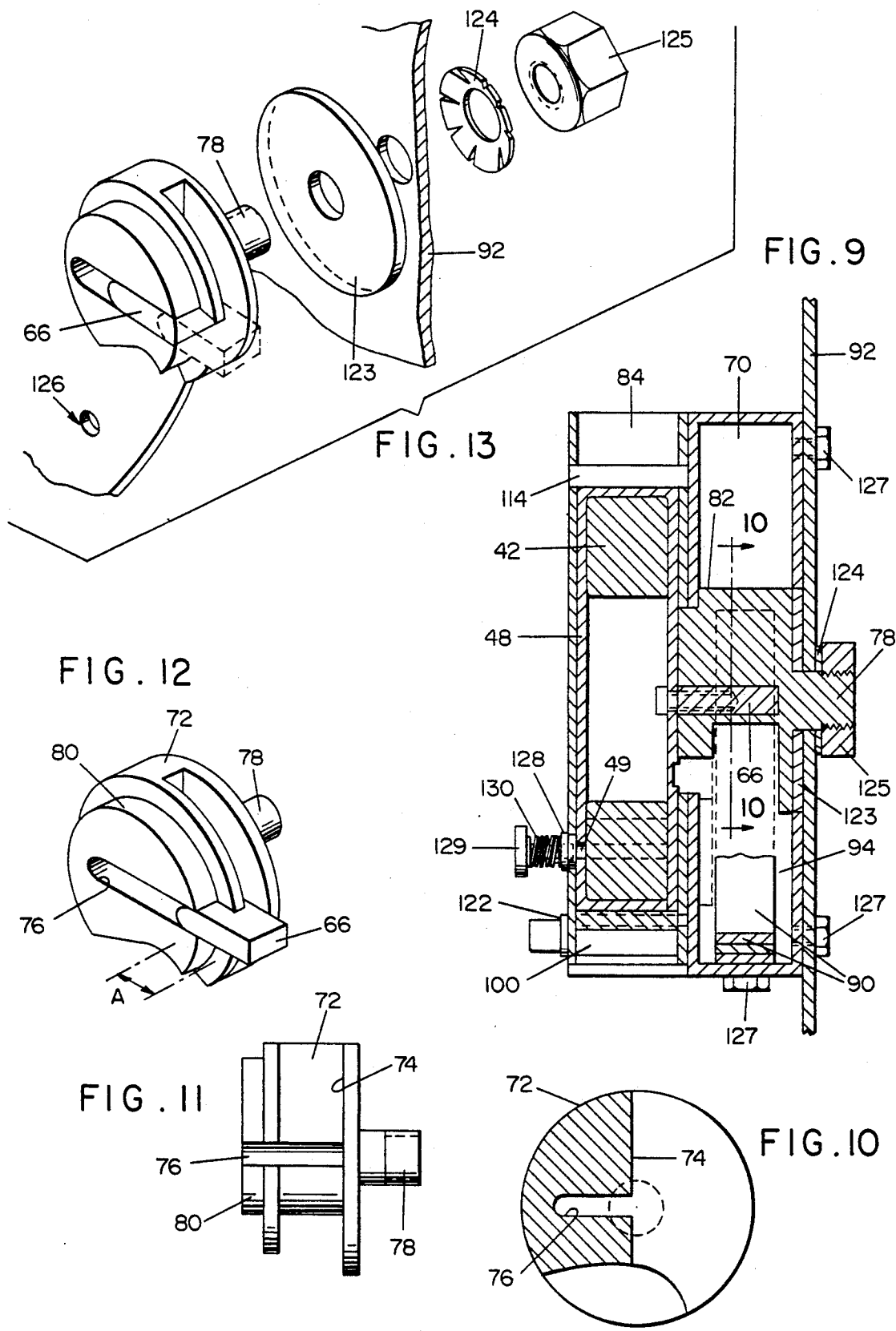

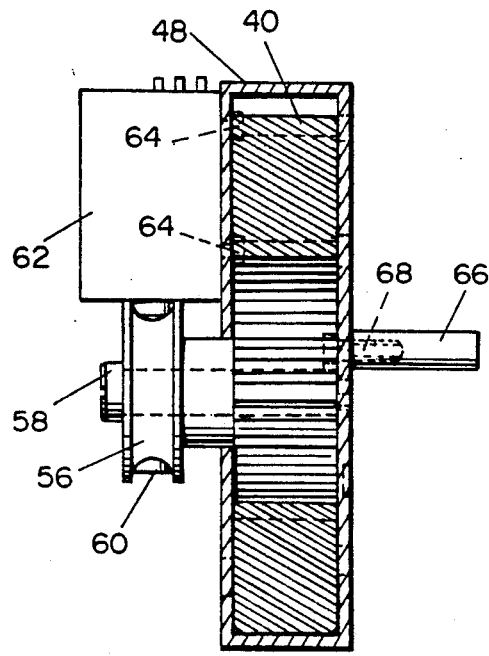
FIG. 15
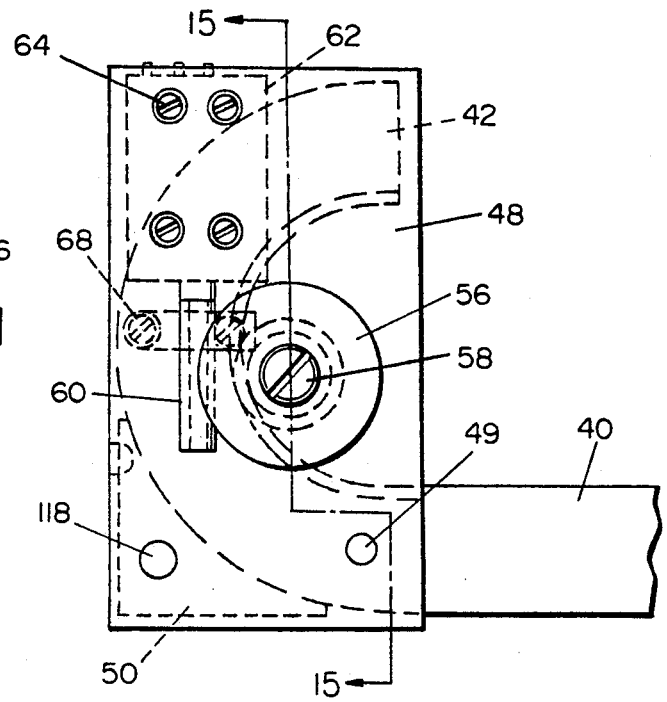
FIG. 14
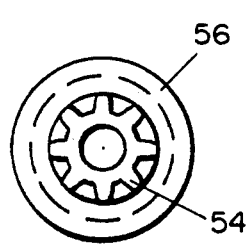
FIG. 16
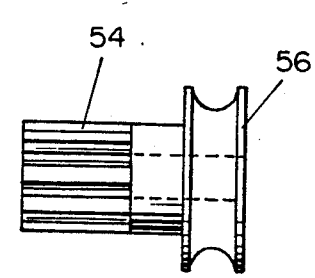
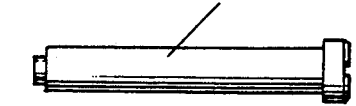
FIG. 17

AUTOMOTIVE BUMPER AND TAILGATE

BACKGROUND OF THE INVENTION

1. Field of the Invention

The present invention generally relates to a bumper for an automobile or a similar vehicle which includes a tailgate structure and a mounting arrangement which enables the tailgate structure to pivot about an axis generally transverse of the vehicle at the rear thereof and at the lower edge portion of the tailgate so that in the event of an impact occurring on the bumper, such as might occur when a trailing vehicle hits the bumper, the tailgate structure will pivot downwardly in a yieldable manner to cushion the shock of the impact, reduce the damage to the vehicles and enhance the safety aspects of bumper structures. The tailgate structure includes tailgate support arms of generally J-shaped configuration associated with a housing and bracket structure as well as a spring device and control arrangements by which the tailgate is capable of yieldable movement for cushioning the impact shock.

2. Information Disclosure Statement

Vehicles have been provided with bumpers to reduce structural damage to the vehicle in the event the vehicle strikes an object or the vehicle is struck by another vehicle at either the forward or rearward ends thereof. Various efforts have been made to support bumpers in a manner that at least a portion of the impact is yieldably absorbed. However, developments of this type have not included a bumper and tailgate structure incorporated into a tailgate arrangement associated with an automobile in which the tailgate structure yieldably absorbs the impact shock and pivots downwardly when an impact contacts the bumper area of the tailgate structure which is located along the lower edge portion thereof.

SUMMARY OF THE INVENTION

An object of the present invention is to provide a bumper and tailgate for automotive vehicles which includes a combined bumper and tailgate arrangement supported from the rear of a vehicle so that when a trailing vehicle impacts a stopped or slower moving vehicle, the bumper and tailgate arrangement will move yieldably in an arcuate manner with the upper end swinging downwardly and rearwardly under the control of a mounting and supporting structure that yieldably resists such movement.

Another object of the invention is to provide a vehicle bumper and tailgate incorporating a tailgate supported by J-shaped arms having gear teeth on the inner curved surface thereof in meshing engagement with a pinion gear mounted on a shaft having a worm wheel and worm gear associated therewith and an electric motor connected with the worm gear.

A further object of the invention is to provide a vehicle bumper and tailgate in accordance with the preceding objects in which the mounting structure includes a leaf spring arrangement, and a pivot and slot arrangement enabling yieldable inward and outward movement of the tailgate in relation to the vehicle on which it is mounted.

A still further object of this invention is to enhance the safety of vehicle occupants by providing a new and unique design of the rear portion of a vehicle which heretofore has been neglected. This new design provides a safety zone to protect the occupants in the event of a rear end collision or an impact from the rear. This new design also facilitates repair of the vehicle since the bumper and tailgate structure can be easily removed and replaced in the event of damage. The new design enables cargo to be more easily loaded into or removed from the vehicle which is especially significant when the vehicle is equipped with adjustable rear shock absorbers. A trailer can be securely connected to the bumper and tailgate of this invention with even heavily loaded trailers not causing undue influence on the driving characteristics of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1 and 2 disclose the vehicle bumper and tailgate of the present invention illustrating the action of the bumper and tailgate in the event a trailing vehicle impacts the rear of a slower moving or stopped leading vehicle.

FIG. 3 is a perspective view of the mounting structure for the tailgate supporting arm when the bumper and tailgate are in their normal position.

FIG. 4 is a perspective view similar to FIG. 3 but illustrating the supporting arm and its associated supporting structure pivoted to the position of FIG. 2.

FIG. 5 is a side elevational view of the structure oriented in the manner of FIG. 3.

FIG. 6 is a side elevational view of the structure oriented in the manner of FIG. 4.

FIG. 9 is a sectional view taken generally along a plane defined by section line 9—9 on FIG. 5.

FIG. 10 is a fragmental sectional view taken along section line 10—10 on FIG. 9 illustrating the slotted disk which receives the guide bracket structure.

FIG. 11 is an elevational view of the slotted disk.

FIG. 12 is a perspective view of the slotted disk and guide bracket structure.

FIG. 13 is an exploded perspective view of the slotted disk and guide bracket.

FIG. 14 is a side elevational view of the tailgate supporting arm and related structure.

FIG. 15 is a sectional view taken along section line 15—15 on FIG. 14.

FIG. 16 is an end view of the pinion gear and worm gear.

FIG. 17 is an exploded side elevational view of the gear of FIG. 16 and supporting bolt.

DESCRIPTION OF THE PREFERRED EMBODIMENT

Figure 7:
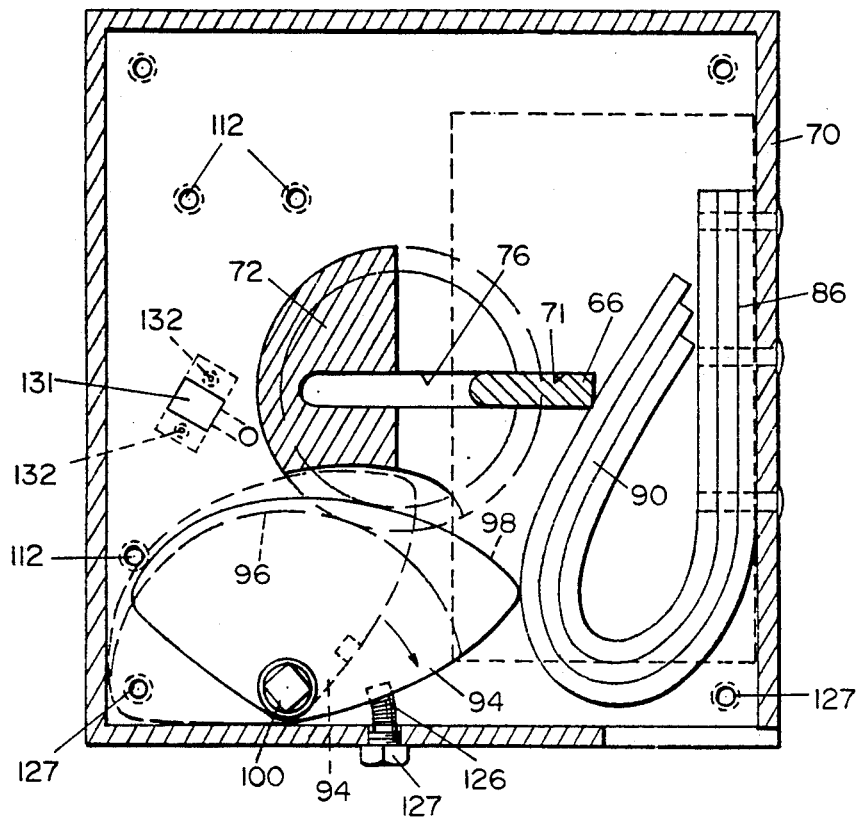
FIG. 7 is a sectional view of the structure in the position of FIGS. 3 and 5.

Referring now specifically to the drawings, FIGS. 1 and 2 illustrate the vehicle and tailgate of the present invention generally designated by reference numeral 30 which is mounted on a leading vehicle generally designated by the numeral 32 with the bumper 30 including a tailgate structure which will swing from a normal position illustrated in FIG. 1 to an impacted position as illustrated in FIG. 2 when a trailing vehicle 34 impacts the bumper 30 and tends to ride under the rear of the leading vehicle 32 with this orientation being designated by numeral 36 in FIG. 2. The vehicle bumper 30 will absorb and yieldably cushion a portion of the impact forces imparted to the rear end of the leading vehicle 32 when a trailing vehicle 34 crashes into the rear of the leading vehicle 32.

Figure 18:
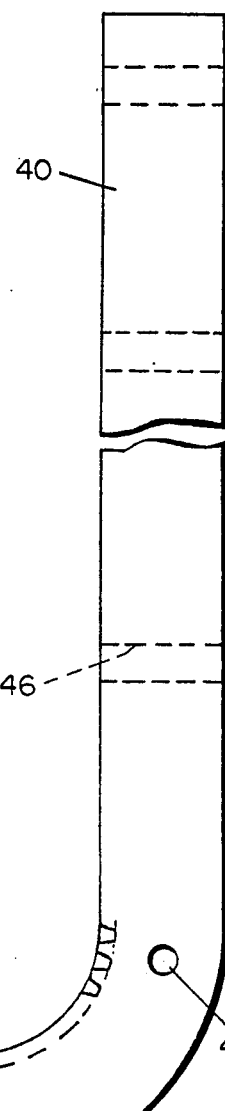
FIG. 18 is an elevational view of the tailgate supporting arm.
Figure 20:
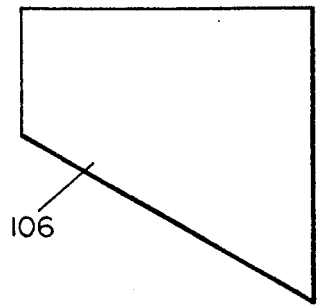
FIGS. 20–30 are elevational views of components of the bumper and tailgate of this invention.
Figure 21:
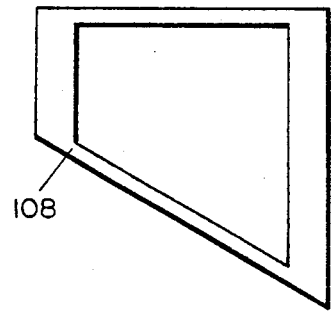
Figure 22:
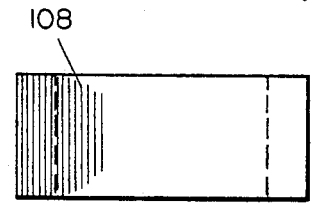
Figure 23:
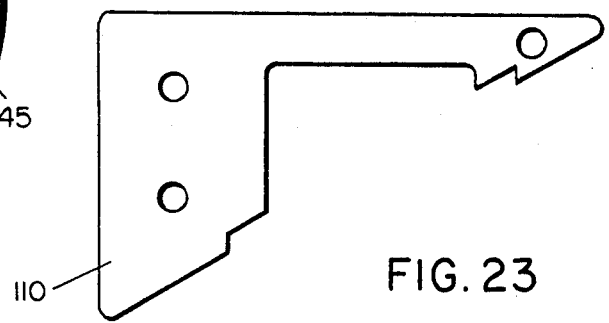
Figure 19:
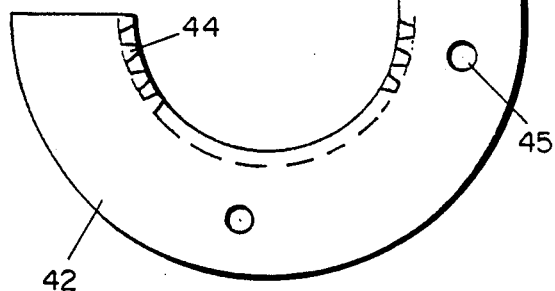
FIG. 19 is a sectional view of the arm of FIG. 18.
Figure 24:
Figure 25:
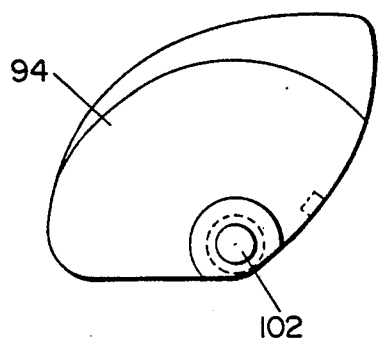
Figure 26:
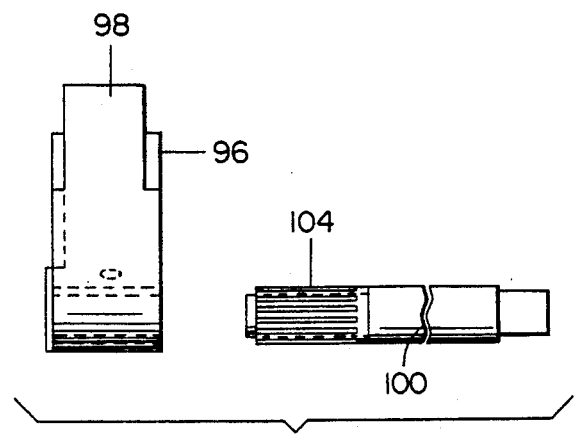
Figure 27:
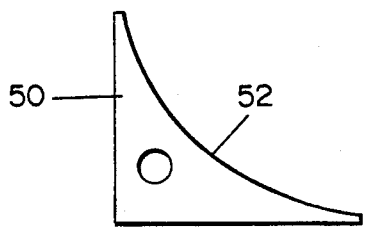
Figure 28:
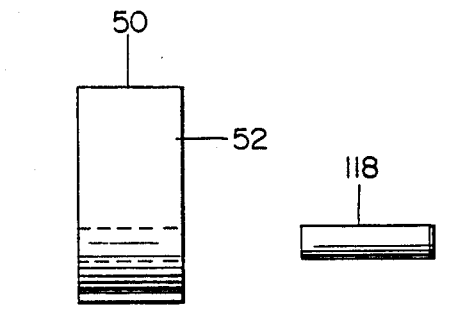

The bumper 30 includes a tailgate structure 38 that is supported at the opposite ends thereof by an elongated, rigid tailgate support arm 40 which is of J-shaped configuration and provided with a reversely curved end portion 42 having gear teeth 44 formed thereon as illustrated in FIG. 18 with the supporting arm 40 including apertures 46 extending therethrough for connecting the support arm 40 to the tailgate 38.

Figure 29:
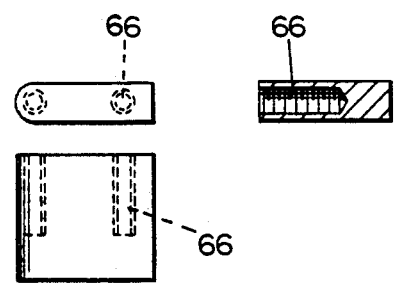
Figure 30:
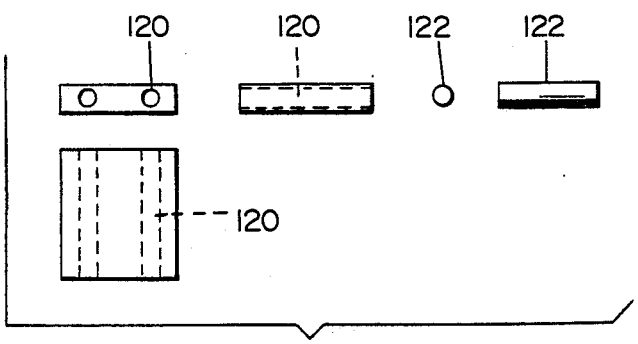

The support arm 40 is received in a hollow rectangular housing or bracket 48 which includes a guide 50 with an arcuate surface 52 thereon that engages and guides the curved end 42 of the tailgate support arm 40. Also mounted in the housing 48 is a spur gear 54 in meshing engagement with the gear teeth 44 on support arm 40. The gear arm 54 is integral with a worm gear 56 that is disposed outwardly of the housing 48 as illustrated in FIG. 15. A bolt 58 extends through the worm gear wheel 56 and spur gear 54 and forms an axle for rotational movement thereof with the bolt supporting the gears 54 and 56 from the housing 48. In meshing engagement with the worm gear wheel 56 is a worm gear shaft 60 rotatable about an axis perpendicular to the worm gear wheel 56 and in tangential meshing engagement therewith with the worm gear 60 being driven by an electric motor 62 mounted on the housing 48 by fasteners 64. Extending laterally from the housing 48 is a guide bracket 66 secured to the housing 48 by screw threaded fasteners 68 with the structure of the guide bracket 66 being illustrated in detail in FIG. 29. The guide bracket extends into a housing 70 for additional components of the invention. As illustrated, the guide bracket 66 is a relatively narrow, generally rectangular platelike member oriented generally centrally of the housing 48 but laterally offset to one side thereof as illustrated in FIG. 14.

Positioned in the housing 70 is a disk 72 of generally cylindrical configuration having an arcuate slot 74 formed in the periphery thereof which extends around a major portion of the periphery thereof as illustrated in FIGS. 10-13. A diametric slot 76 is provided in the disk 72 which slidably receives guide bracket 66 and intersects with the slot 74 and extends substantially throughout the diametric extent of the disk 72 on one surface thereof as illustrated in FIG. 12 with the opposite side of the disk 72 including a projection or bracket 78 that extends through the housing 70 as illustrated in FIG. 9. Also, the disk 72 includes a peripheral shoulder 80 on the side thereof which has the slot 76 thereon for reception in an enlarged opening 82 in the side wall of the housing 70 which is disposed against a housing 84 which receives the housing 48 for the tailgate arm 40. As illustrated in several of the figures, the guide bracket 66 is slidably disposed in the slot 76 and also slides into slot housing 70 and slot housing 84 to hold the bumper and tailgate in perpendicular upright condition. The disk 72 and the guide bracket 66 may move in relation to each other with the two positions of the guide bracket 66 and slot 76 being illustrated in FIGS. 5 and 6. The guide bracket 66 will slide free in slot 76 and in slotted housings 70 and 84 upon impact by a trailing vehicle.

Figure 8:
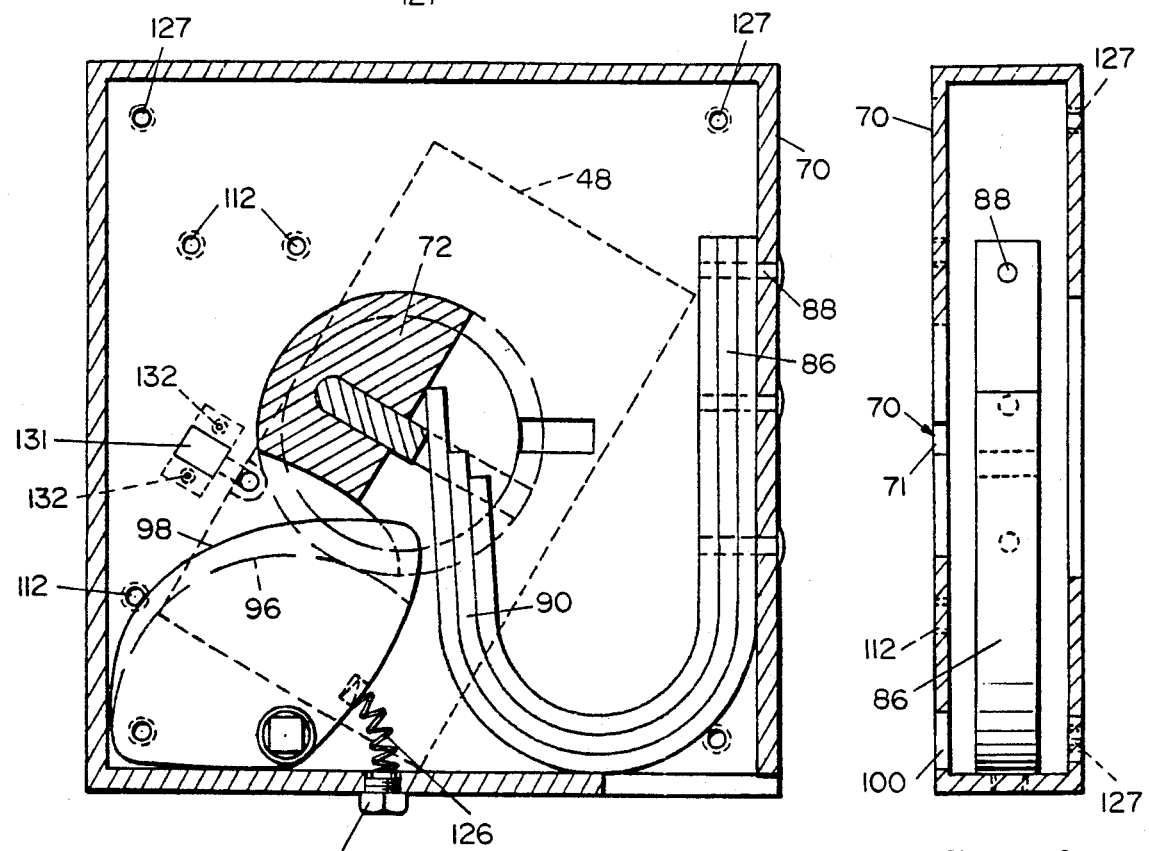
FIG. 8 is a sectional view of the structure in the position of FIGS. 4 and 6.
Figure 8A:
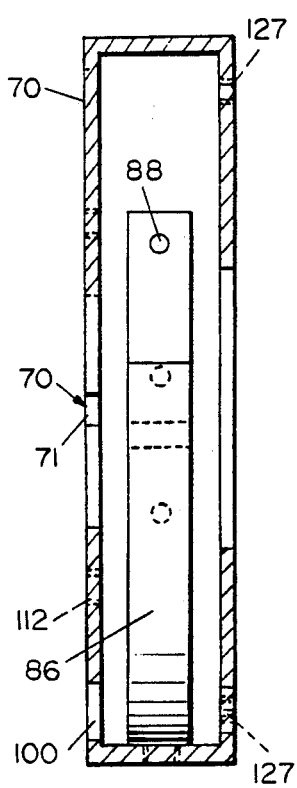
FIG. 8A is a sectional view of the housing.

Also positioned within the housing 70 is a multi-leaf spring 86 of generally U-shaped configuration and secured to the interior of the housing 70 by rivets or other fasteners 88 as illustrated in FIGS. 7 and 8 with the reversely curved free end portions 90 of the spring 86 engaged with the outer edge of the guide bracket 66 for biasing the housing 70 and the guide bracket 66 in opposed directions with FIGS. 7 and 8 illustrating the two positions of the spring 86 and the guide bracket 66 in relation to the disk 72.

As illustrated in FIGS. 3 and 4, the housing 70 is secured to the chassis 92 of the vehicle so that it becomes a rigid component with the vehicle while the support arm 40 and the housing 48 can pivot and move in a manner illustrated in the drawings with one position as, illustrated in FIG. 1 corresponding to FIGS. 3, 5 and 7 and the other position illustrated in FIG. 2 corresponding to FIGS. 4, 6 and 8.

Mounted in the housing 70 is a cam structure 94 having a pair of side members. 96 which are disposed outwardly of the peripheral edges of the disk 72 as illustrated in FIG. 9 and a central member 98 which is oriented for engagement with the end portion 90 of the spring 86. The cam structure 94 is supported on a bolt or shaft 100 journalled in the housing 70 and extends through a passageway 102 in the cam structure 94 and is splined thereto at 104 wit the other end of the shaft 100 extending into the housing 84.

The cam structure 94 is used to move the end 90 of spring 86 toward the arm 40 to enable a safety bracket 106 to be positioned in the housing 84. The trapezoidal bracket 106 is oriented in opposed relation to the housing 48. A similar trapezoidal bracket 108 of hollow construction is positioned between the bracket 106 and the housing 48 as illustrated in FIG. 3. Mounted in housing 84 is an inverted L-shaped bracket 110 as illustrated in FIGS. 5 and 6 with the bracket 110 being secured in position by bolts 112. Safety pins or bolts 114 are positioned through housing 84 which are received in angulated slots 116 as illustrated in FIGS. 5 and 6 to retain the tailgate supporting arms 40 in angulated position. The tailgate arm guide 52 is secured in place by a fastening bolt or the like 118. A safety bracket 120 for the tailgate support arm housing is provided outwardly of the housing 48 and supported from the housing 84 with safety pins or bolts 122 securing the safety bracket 120 in place.

As illustrated in FIGS. 9 and 13, the disk 72 has a bracket washer 123 interposed between the disk 72 and the chassis 92 and the externally threaded shaft or bracket 78 has a concavoconvex slitted friction washer 124 mounted thereon between the chassis 92 and a crown nut 125 with the crown nuts being left and right-handed threaded on the opposite sides of the vehicle. As illustrated in FIGS. 7 and 8, a return spring 126 engages the cam structure 94 to push the cam structure 94 free from the curved ends 90 of the spring blades 86 toward the disk 72 with hexagon bolts 127 being provided to retain the spring 126 in place and to enable removal thereof when desired. Similar hex bolts 127 are used to secure the housing 70 to the chassis 92 as illustrated in FIG. 9.

An adapter 128, a slidable pin 129 with a knurled head received therein and a pressure spring 130 mounted thereon is threaded into the housing 84 with the pin 129 including a lock spring thereon to releasably retain the pin 129 engaged with an aperture 45 in the support arm 40 for the tailgate.

An electrical relay 131 is mounted on the housing 70 by screws 132 to control the electric motor in response to movement of the housing 48 and the support arm 40 mounted therein.

The cam structure 94 is used to press or push the spring blades 86 back to a start position as illustrated in FIG. 7 in which the ends 90 of the springs are biased. In order to do this, a ratchet wrench or other similar wrench may be connected to the square or polygonal end on the shaft or bolt 100. The J-shaped arms 40 and the housing 48 is then free from pressure and the bumper and tailgate can be pulled back to a perpendicular position with the help of the slide pin 129 extending through a hole 49 on the housing 84. In this position, a new safety bracket 108 or 106 can be utilized if the previous safety bracket was deformed by a rear impact.

When in the normal or start position, upon a slight impact occurring, the safety bracket 108 will be deformed to a small extent and can be replaced with a new one for the safety of the occupants of the vehicle rather than trying to repair the bracket 108. As illustrated in FIGS. 5 and 6, a distance A is set forth in several locations which indicates the distance moved by the components during impact resistance before the bumper and tailgate pivotal movement occurs with this distance being permitted by the movement of the bracket 66 in the slot 76, the slot 71 in housing 70 and the slot 85 in housing 84.

In use, the safety bracket 108 will be deformed into a collapsed block and will be retained in place within the L-shaped bracket 110 on housing 70 and housing 84. The safety bracket 108 which has been deformed must be replaced by a new safety bracket after an impact has occurred. With the assembly in the start position, the guide bracket 66 is pushed forwardly by the impact collision from the trailing vehicle and by the spring blades 86 in the housing 70. The J arms 40 and housing 48 will be pushed forwardly a distance A as illusrated in FIGS. 5 and 6. The safety bracket 108 in L-shaped bracket 110 will not move after an impact or collision because of the slide bolts 114 in the angular slots. The three slide bolts 114 and guide bracket 120 and the housing 70 and 84 are the guide for the support arm housing 48 and for the bumper and tailgate.

The slide pin adapter 128 is connected to the housing 84 and with the help of the slide pin 129 and pressure spring 130, the slide pin will be pressed inwardly into housing 48 to help to provide a reassembly of a new safety bracket 108 or 106. After reassembly, the slide pin 129 will release from the hole to take away the pressure of the spring 130 to take back or pull back the slide pin 129. In assembly of the device, the cam structure 94 pushes the spring blades over to the position illustrated in FIG. 7 and the safety bracket 106 or 108 will keep the spring blades under tension. From the inside of the trunk of the vehicle, four hexagon bolts or screws 127 will be removed with the only item on the vehicle then being disk 72, the washer 123, spring 124 and nut 125. The tailgate can be removed from the J-shaped arms 40 thereby facilitating assembly and disassembly of the bumper and tailgate in relation to a vehicle.

Guide bracket 120 is used for the support of housing 48 and if the bumper and tailgate presses excessively on the housing 70, 84 and disk 72, such pressure will be relieved by the guide bracket 120, the slide bolts 114 and safety bracket 108. In an impact or collision, the housing 48 will be pushed forward by the force exerted by the trailing vehicle. The speed of the impact can be an important factor in the seriousness of injuries and damages to the vehicle and occupants. At slow speed, the safety bracket 120 and the two safety pins 122 will be destroyed and at a higher speed the safety guide bracket 120 along with the safety pins for the purpose of saving lives of accident victims and reducing the severity of their injury. A high speed impact will push the bumper and tailgate forwardly fast and the safety bracket 108 will be directly destroyed by deforming it into a cohesive block and the three spring blades moved toward the disk 72 with the bumper and tailgate having a quick downward movement on the trailing vehicle hood to partially lift the leading vehicle as illustrated in FIG. 2. The two electric motors can be synchronized with this vertical movement to provide an additional lift to the rear of the lead vehicle. The start of the electric motor responds to the relay 131 so that when the relay is pushed inward for a short period of time due to impact by the safety bracket 106, a short connection is made in the relay 131. The J-shaped support arms 40 moves to some degree on the start of the electric motors in the short time of the impact and downward movement of the tailgate lifts the back part of the lead vehicle a little and can be used to lift the vehicle up or down.

The up and down movement of the tailgate can be used for different purposes such as to lift a light load including lifting the rear of the vehicle to change a tire, use the tailgate as an air foil to press the rear wheels onto the road surface and to use a tow trailer having two wheels by connecting the tow trailer to the tailgate when horizontally disposed thereby providing more stability to the two-wheeled trailer since the vehicle and trailer will have six wheels on the road. If the rear wheels become stuck in sand or snow, the downward movement of the tailgate can be used to assist the vehicle by lifting the wheels and enabling material to be filled in under the wheels. Many other significant benefits are derived from the tailgate.

The bumper tailgate combination may be used with various types of vehicles such as the bumper and tailgate on a pickup truck body. The tailgate may be provided with a trailer structure by positioning a pair of support members on the tailgate when it is in a horizontal position with the rearward ends of the support members being interconnected and provided with a supporting wheel or wheels so that a load may be supported on the tailgate and on the support members and interconnecting members for the wheels. This type of structure may be utilized on various types of vehicles, including automobiles, pickup trucks and various types of automobiles and trucks. This structure is very effective in reducing injury to rear seat passengers and materially reduces the repair time and expense in the event of a rear end collision. Trailers connected to the tailgate may be provided with various kinds of equipment and may be used with various other structures to carry boat trailers, campers and the like.

With the bumper and tailgate of this invention installed in a vehicle and a trailing vehicle strikes the rear end of the lead vehicle, the forces generated by the impact activate the tailgate structure to pivot it toward the position illustrated in FIG. 2 which minimizes the impact forces and yieldably absorbs those forces.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

WHAT IS CLAIMED AS NEW IS AS FOLLOWS:

1. A vehicle bumper comprising a tailgate assembly, a supporting arm for each lateral end of the tailgate, bracket means supporting the tailgate support arms from the rear of a vehicle and means responsive to impact of a trailing vehicle for movement of the tailgate from a generally vertical rear position toward the front of the vehicle and then about a generally horizontal pivot axis to an inclined position to deflect the impact forces and yieldably absorb the impact forces.

2. The bumper as defined in claim wherein each tailgate supporting arm is of J-shaped configuration with the curved end of the arm having gear teeth therein, said means pivoting the tailgate including an electric motor and gear assembly connected with the support arms to pivot the arms and tailgate.

3. The bumper as defined in claim 2 wherein said bracket means includes a housing with a slotted disk rotatably journalled therein, a guide bracket slidable in the disk and spring means engaged with the guide bracket.

4. The bumper as defined in claim 4 together with slot means receiving said guide bracket to interconnect the slotted disk and housing, said slot means enabling the guide bracket to move diametrically relative to said disk.

5. The bumper as defined in claim 4 together with cam means rendering said spring means inoperative to enable the support arms to be moved back to vertical position.

6. The bumper as defined in claim 5 wherein said bracket means comprises a housing having a curved guide for the curved end of the support arms.

* * * * *